US012619255B1

(12) United States Patent (10) Patent No.: US 12,619,255 B1
Vosburgh et al. (45) Date of Patent: May 5, 2026

(54) SELF-PROTECTING RADIO FREQUENCY (RF) SEEKERS

(71) Applicant: Archaius Inc., Durham, NC (US)

(72) Inventors: Frederick Vosburgh, Durham, NC (US); Kristopher McGuire, Raleigh, NC (US); Lee B. Baker, Raleigh, NC (US)

(73) Assignee: Archaius Inc., Durham, NC (US)

( * ) Notice: Subject to any disclaimer, the term of this patent is extended or adjusted under 35 U.S.C. 154(b) by 163 days.

(21) Appl. No.: 18/437,981

(22) Filed: Feb. 9, 2024

Related U.S. Application Data

(63) Continuation-in-part of application No. 18/244,942, filed on Sep. 12, 2023, which is a continuation-in-part of application No. 18/238,152, filed on Aug. 25, 2023, which is a continuation-in-part of application No. 18/222,184, filed on Jul. 14, 2023, now Pat. No. 12,339,392.

(60) Provisional application No. 63/447,771, filed on Feb. 23, 2023.

(51) Int. Cl.
| | |
|---|---|
| *G07C 5/00* | (2006.01) |
| *G05D 1/644* | (2024.01) |
| *G07C 5/02* | (2006.01) |
| *G07C 5/04* | (2006.01) |
| *G07C 5/08* | (2006.01) |
| *H04K 3/00* | (2006.01) |

(52) U.S. Cl.
CPC ............. *G05D 1/645* (2024.01); *H04K 3/224* (2013.01)

(58) Field of Classification Search
CPC .............................. G05D 1/645; H04K 3/224
See application file for complete search history.

(56) References Cited

U.S. PATENT DOCUMENTS

| | | | | |
|---|---|---|---|---|
| 3,964,065 A | * | 6/1976 | Roberts | H04B 7/086 |
| | | | | 342/380 |
| 5,355,767 A | | 10/1994 | Morita | |
| 5,440,308 A | | 8/1995 | Dybdal et al. | |
| 5,440,636 A | * | 8/1995 | Herrick | H04B 1/713 |
| | | | | 380/34 |
| 6,590,528 B1 | | 7/2003 | DeWulf | |
| 6,847,328 B1 | | 1/2005 | Libonati et al. | |

(Continued)

FOREIGN PATENT DOCUMENTS

| | | |
|---|---|---|
| CN | 204856097 U | 12/2015 |
| CN | 111707447 A | 9/2020 |

(Continued)

OTHER PUBLICATIONS

Gangil Byun, Hosung Choo, and Sunwoo Kim, "Improvement of Pattern Null Depth and Width Using a Curved Array With Two Subarrays for CRPA Systems", IEEE Transactions on Antennas and Propagation, vol. 63, No. 6, Jun. 2015, pp. 2824-2827.

(Continued)

*Primary Examiner* — Kito R Robinson
*Assistant Examiner* — Anthony Gabriel Mora
(74) *Attorney, Agent, or Firm* — Neo IP

(57) ABSTRACT
Seeker devices and methods of navigation are disclosed. Devices comprise a self-protecting direction finder that can determine direction to a source of RF interference, cancel the interference, and provide direction signals and desirably received signals to the flight controller, which guides navigation with respect to the jammer.

19 Claims, 2 Drawing Sheets

10

20

(56) References Cited

U.S. PATENT DOCUMENTS

| | | | |
|---|---|---|---|
| 6,861,983 | B2 | 3/2005 | Casabona et al. |
| H2224 | H | 10/2008 | Madden |
| 7,733,288 | B2 | 6/2010 | Williams |
| 8,125,398 | B1 | 2/2012 | Paulsen |
| 8,965,319 | B2 | 2/2015 | Wilkerson et al. |
| 9,519,062 | B2 | 12/2016 | Vosburgh et al. |
| 10,330,769 | B1* | 6/2019 | Mayer .................. G01S 5/0278 |
| 10,581,155 | B1 | 3/2020 | Gradinaru et al. |
| 10,735,037 | B2 | 8/2020 | Floyd et al. |
| 10,868,609 | B1 | 12/2020 | Kossin et al. |
| 10,922,982 | B2 | 2/2021 | Magdaleno |
| 2002/0015439 | A1 | 2/2002 | Kohli et al. |
| 2003/0031279 | A1 | 2/2003 | Blount et al. |
| 2010/0007555 | A1* | 1/2010 | Ezal ...................... H01Q 25/00 |
| | | | 342/417 |
| 2010/0045506 | A1* | 2/2010 | Law ........................ G01S 19/21 |
| | | | 342/13 |
| 2012/0154213 | A1* | 6/2012 | Bull .................... G01S 5/02526 |
| | | | 342/450 |
| 2012/0252392 | A1 | 10/2012 | Wilkerson et al. |
| 2015/0349432 | A1* | 12/2015 | Vosburgh ............... H01Q 1/243 |
| | | | 343/905 |
| 2016/0349375 | A1 | 12/2016 | Littlefield et al. |
| 2017/0261999 | A1 | 9/2017 | Van Voorst |
| 2017/0293265 | A1 | 10/2017 | Salle et al. |
| 2018/0375487 | A1 | 12/2018 | Chen et al. |
| 2019/0259280 | A1* | 8/2019 | Lamkin ........... G08G 1/096791 |
| 2019/0372725 | A1 | 12/2019 | Hongo |
| 2020/0005656 | A1* | 1/2020 | Saunamaeki .......... G05D 1/104 |
| 2020/0102074 | A1* | 4/2020 | Kinsley ................ A61B 5/0024 |
| 2020/0169287 | A1 | 5/2020 | Kim et al. |
| 2021/0018936 | A1 | 1/2021 | Di Pietro et al. |
| 2021/0173036 | A1* | 6/2021 | Guezelarslan ........... H01Q 1/28 |
| 2021/0248488 | A1* | 8/2021 | Naseef .................. H04W 24/02 |
| 2021/0344437 | A1* | 11/2021 | Baracca ............... H04J 11/0023 |
| 2022/0014205 | A1 | 1/2022 | Petrov et al. |
| 2022/0163676 | A1 | 5/2022 | Amarnathan |
| 2022/0285845 | A1 | 9/2022 | Panther et al. |
| 2022/0324572 | A1 | 10/2022 | Alzahrani |
| 2022/0397375 | A1 | 12/2022 | Hyman |
| 2025/0116488 | A1 | 4/2025 | Ferreira et al. |

FOREIGN PATENT DOCUMENTS

| | | |
|---|---|---|
| KR | 20170070816 A | 6/2017 |
| KR | 102428558 B1 | 8/2022 |

OTHER PUBLICATIONS

Sidney P. Applebaum, "Adaptive Arrays", IEEE Transactions on Anennas and Propagation, vol. AP-24, Ko. 5, Sep. 1976, pp. 585-598.

U.S. Appl. No. 18/222,184, filed Jul. 14, 2023, titled "Devices, Systems, and Methods for Cancellation Bandwidth-Adjustable Nulling of Interference".

18222184_2024-12-09_CN_ 111707447 A_M.pdf, machine translation of CN-111707447-A (Year: 2020).

18222184_2024-12-10_KR_20170070816_A_M.pdf, machine translation of KR-20170070816-A (Year: 2016).

Drake et al., "Single Channel Multiple Signal Classification Using Pseudo-Doppler" IEEE Signal Processing Letters vol. 30, 1587-1591 (Oct. 26, 2023).

Peavey et al., "The single channel interferometer using a pseudo-Doppler direction finding system," IEEE International Conference on Acoustics, Speech, and Signal Processing, Munich, Germany, (Apr. 21, 1997).

* cited by examiner

FIG. 2

SELF-PROTECTING RADIO FREQUENCY (RF) SEEKERS

CROSS-REFERENCE TO RELATED APPLICATIONS

This application is related to and claims priority from the following US patents and patent applications: this application is a continuation-in-part of U.S. patent application Ser. No. 18/244,942, filed Sep. 12, 2023, which is a continuation-in-part of U.S. patent application Ser. No. 18/238,152, filed Aug. 25, 2023, which is a continuation-in-part of U.S. patent application Ser. No. 18/222,184, filed Jul. 14, 2023, which claims priority from and the benefit of U.S. Provisional Patent Application No. 63/447,771, filed Feb. 23, 2023. Each of the above applications is incorporated herein reference in its entirety.

BACKGROUND OF THE INVENTION

1. Field of the Invention

This disclosure relates to seeker devices and methods of navigation. More specifically, it relates to devices comprising a self-protecting direction finder that can determine direction to a source of radio frequency (RF) signals.

2. Description of the Prior Art

U.S. Pat. No. 8,125,398 by Paulsen discloses GPS-guided artillery shells having a nose-mounted forward-looking antenna and a circumferentially exposed slot antenna aft of the nose. The nose mounted antenna is omni-directional and therefore immune to amplitude variation caused by rotation of the shell in flight. The slot antenna has a gain pattern that does not overlap that of the nose-mounted antenna, and has an on-axis phase center for receiving signals without rotation-induced modulation of amplitude or phase of the received signal induced by spinning of the shell, but neither antenna defends against jamming. Paulsen also teaches aft-looking reception of remote-control signals. In any case, neither antenna provides protection against jamming.

U.S. Pat. No. 6,861,983 disclosed by Casabona et al describes methods and apparatus for improving reception of GPS signals by vehicles subject to pitch or roll while traveling on uneven ground by combining signals from two orthogonally oriented antennas to maintain received signal strength to compensate for the effect of rolling.

U.S. Pat. No. 7,733,288 by Williams discloses the use of antennas arranged between a receive antenna and source of interference, such as a co-site transmitting antenna, to selectively absorb the transmission, thereby improving the relative strength of desirably received signals.

U.S. Pat. No. 10,735,037 for tunable filters, cancellers, and duplexers by Floyd, et al., teaches use of passive mixers to cancel self-interference of wireless transmit signals that couple into a receive antenna, thereby interfering with reception of SOI such as mobile phone signals. The disclosed method uses a copy of the transmit signal, including distortion generated by the power amplifier, which is compensated and combined with the received signal to selectively cancel the transmit signals including its distortion.

U.S. Pat. No. 8,965,319 by Wilkerson at al. (2015) discloses methods and devices for reducing radio frequency interference by deterministic, feed-forward cancellation of even saturating jamming signals to selectively isolate radio frequency (RF) signals of interest (SOI). The disclosed method also includes the finding of the direction to a source of jamming superior to other anti-jamming antennas.

U.S. Pat. No. 9,519,062 by Vosburgh et al discloses devices and methods for cancelling in-band interference of global positioning system (GPS) signals using evanescent fields to cancel jamming before it enters the receive antenna vs. canceling it after the fact. While this invention provides deep nulls, time delay due to the system design and component limitations result in a narrow cancellation bandwidth, limiting its effectiveness against wideband interference.

Given the importance of drones and the ubiquity of drone guns on the battlefield, we propose drones having a navigation system that allows them to navigate by GPS or under remote-control, to defeat jamming of such signals, and to navigate with respect to such jamming, e.g. by homing, even in the face of disruptive jamming to interdict a drone gun or other sources of jamming, providing a low cost/high value vehicle that addresses emerging requirements of modern warfare.

The current disclosure of cancellation provides anti-jamming nulls that are wide in the spectral domain and narrow in the spatial domain, provided by devices having a SWAP low enough even for drones, addressing multiple shortcomings of prior anti-jamming systems.

SUMMARY OF THE INVENTION

The present invention relates to autonomous or remote-controlled vehicles having anti-jamming systems for isolation of radio frequency (RF) signals of interest (SOI) from interference (hereinafter "jamming") by selective cancellation, and, more specifically adjusting Time Difference of Arrival (TDOA) of antenna signals at a signal combiner for adjusting cancellation, or instantaneous, bandwidth.

In one embodiment, the anti-jamming antenna system is of symmetric design in which a first antenna is connected to the first input of a combiner via a signal path comprising a controllable delay element and a phase rotator connected in series between the first antenna and the combiner, and at least one second antenna is connected to a second input of the combiner via a signal path comprising a controllable delay element and a phase rotator connected to series between the second antenna and the combiner. A power detector is connected between the output of combiner and the system controller, to the first signal path and the second signal path. The method comprises rotating phase according to the method described in U.S. Pat. No. 9,519,062, which is incorporated herein by reference in its entirety, together with setting TDOA according to a desired or predetermined cancellation bandwidth.

In another embodiment, the system comprises an asymmetric design in which the at least one second signal path differs from first signal path with respect to one or more of the components and/or propagation time.

In a third embodiment, the system comprises a plurality of stages in one embodiment comprising a first canceller and a second canceller, the outputs of which are connected to a third canceller in a cascade like design for providing additional cancellation of a first jammer or cancellation of a second jammer. This system is operable to be extended to additional stages for cancellation of a plurality of jammers.

These and other aspects of the present invention will become apparent to those skilled in the art after a reading of the following description and figures elucidating the invention.

BRIEF DESCRIPTION OF THE DRAWINGS

FIG. 2 illustrates a diagram of a direction finder.

DETAILED DESCRIPTION

Electronic attack has changed the face of modern warfare, with countermeasures being increasingly vital to mission success. One example countermeasure is the HARM missile used to destroy enemy radars. Another example is the controlled radiation pattern antenna (CRPA) that can reduce GPS jamming. While a CRPA are far less expensive than a HARM, they are rarely used on drones for several reasons; inadequate anti-jamming, inability to find direction to a jammer, and size, weight and power (SWAP). On a related point, the Wi-Fi links used for command and control (C2) of quadcopters and loitering munitions remain unprotected against jamming. The vulnerability of GPS or C2 to jamming results in thousands of drones being lost to electronic attack each month in Ukraine.

In sum, recent wars in Ukraine and Nagorno Karabakh teach us that drones must be able to protect themselves against electronic attack and to counterattack, e.g. destroying drone guns, even in the face of disruptive jamming.

In light of the above, we disclose a low SWAP seeker and methods of its operation to protect reception of GPS or other RF signals against electronic attack by finding the direction to a jammer, mitigating its power, and guiding a drone in kamikaze attack against a disruptive jammer. The seeker may include a transmitter that can send data to an operator or another drone.

This disclosure employs the terms direction finder, signal combiner and flight controller according to their common usage. Seeker is intended to cover navigation generally, not just the homing implied by the term. Drone is intended to encompass any vehicle or person that relies at least partly on GPS or other navigation aiding signals. Navigation aiding is intended to cover command and control (C2) signals and RF signals of opportunity as well as GPS type signals. Jammer is intended to cover any sources of RF emissions including cell towers, Wi-Fi repeaters and military radios, among others. Navigation relative to a jammer is intended to cover moving towards or away from a jammer or at an angle to its direction.

Figure 1:
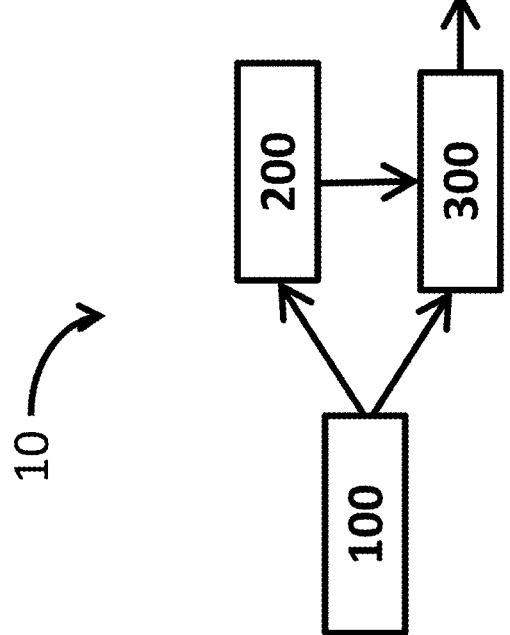
FIG. 1 illustrates a system including a direction finder, a flight controller, and a receiver.
Figure 1:
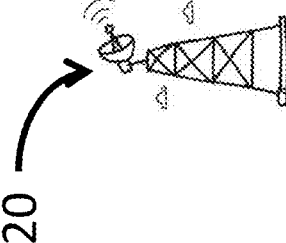

Referring to FIG. 1, seeker 10 comprises a direction finder (DF) 100 connected to a flight controller (FC) 200, the DF 100 being any type that can determine the direction to a jammer 20. DF 100 comprises jammer mitigating type, e.g. a canceller or combined power minimizer. In some cases, DF 100 is connected to a receiver 300 that can receive global positioning system (GPS), command and control (C2) or other RF signals. Receiver 300 is connected to the FC 200 as well as to the DF 100. The FC 200 is any that can guide drone navigation according to signals from the DF 100, either directly or via the receiver 300.

Figure 2:
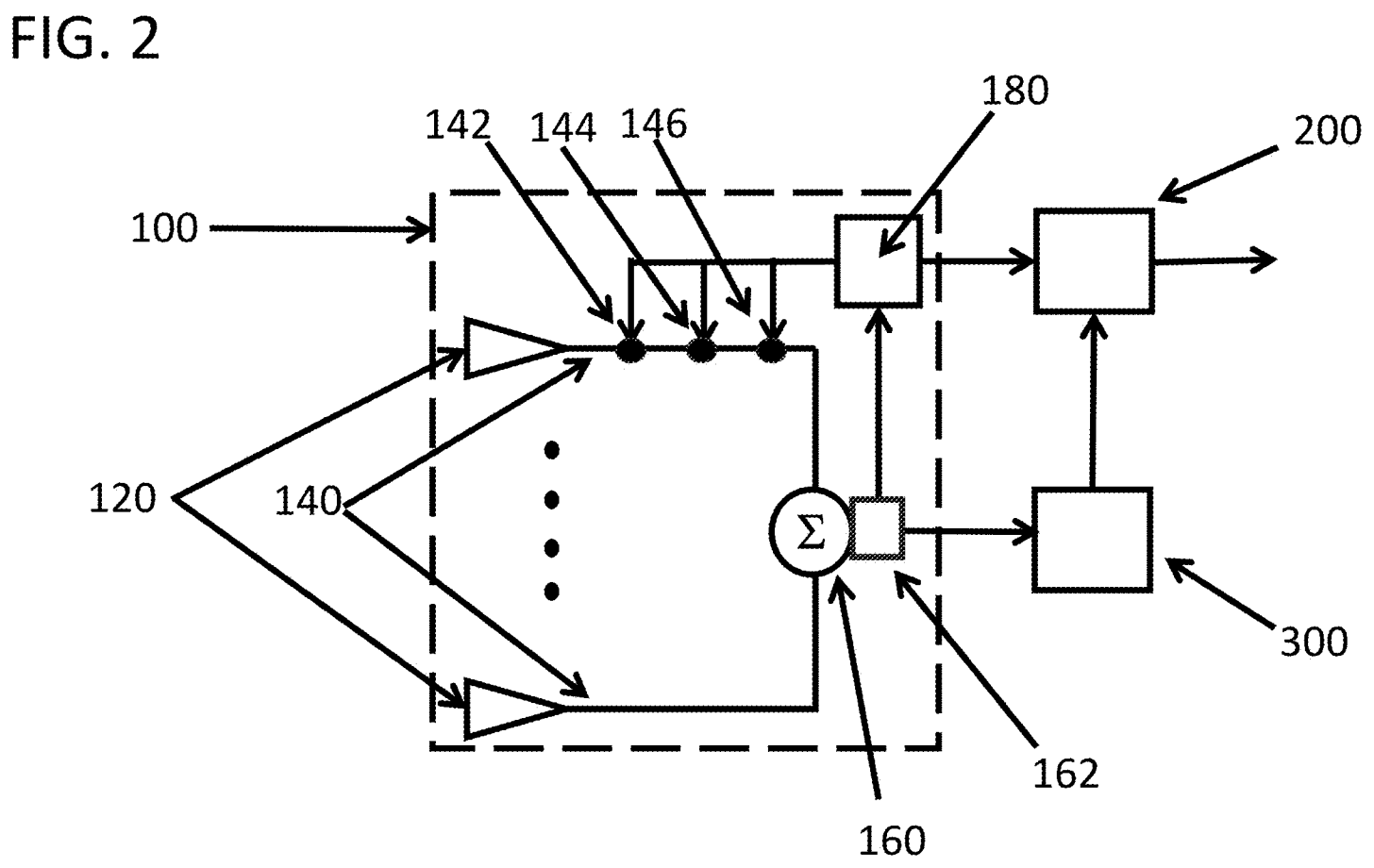

Referring to FIG. 2, the DF 100 comprises at least two RF receiving antennas 120 connected by signal paths 140 to a combiner 160, the output of which is further connected to a DF controller 180 and/or to a receiver 300. The output of the combiner 160 is connected to a power detector 162 that is further connected to the DF controller 180 and the receiver 300. In some cases, the input ports of the combiner 160 incorporate power detectors (not shown). The DF controller 180 is any type that can determine direction to a source of jamming by processing signals from the combiner 160. DF controller 180 is any type that can provide steering or direction signals to the FC 200.

The FC 200 is any type that can guide navigation according to signals from the DF 100 and/or the receiver 300. FC 200 is any that can also provide normal FC functions, e.g. control of drone pose. In some cases, FC 200 is any that can guide navigation when encountering degrading or disruptive jamming.

The DF controller 180 is connected to an RTA adjuster 142 integrated in at least one signal path 140. RTA adjuster 142 is any type that can adjust the time of arrival of a signal at the combiner 160 for example to reduce the relative time of arrival (RTA) of antenna signals at the combiner 160. RTA adjuster 142 is any that can adjust the instantaneous bandwidth (IBW) over which jammer power is cancelled and adjust for jammer direction. The DF controller 180 is connected to an amplitude adjuster 144 incorporated in at least one signal path 140. Amplitude adjuster 144 is any type that can increase or decrease amplitude of an antenna signal, one use of which is to better equalize antenna signals entering the combiner 160. DF controller 180 is connected to a phase shifter 146 incorporated in at least one signal path 140. The phase shifter 146 operates by I/Q rotation, although this is not required. RTA adjuster 142, amplitude adjuster 144 and phase shifter 146 preferably are high resolution type. Although adjusters 142, 144, 146 are shown in one signal path 140, each type of component can also be incorporated in a second signal path 140. DF controller 180 is any type that can find jammer direction by processing combiner output signals.

The first antenna 120 and second antenna 120 are preferably of equivalent type, e.g. equivalent omnidirectional or directional gain patterns. Antennas 120 can have any frequency bandwidth suitable for a given use case, e.g. GPS, Wi-Fi, 6G. Antennas 120 are passive, although this is not required. Antennas can be multi-band, e.g. comprising multiple elements or having multiple resonances.

The inventive method comprises an FC guiding a drone according to GPS and/or C2 (together "nav-aid") signals from receiver and/or according to direction signals from the DF. For example, a quadcopter controlled by a remote user over a C2 link can navigate according to C2 and/or by nav-aid signals. When reception of nav-aid and/or C2 signals are disrupted or at risk of disruption, FC navigates the drone using direction signals from the DF. Navigating without nav-aid signals can be include flying away or towards a jammer, and/or flying at an angle to the jammer direction.

The seeker method also comprises spoofer-direction finding. For example, when a drone navigating by nav-aiding signals navigates in in an undesirable direction, e.g. detected by the remote operator, the FC can guide the drone according to DF, vs. spoofing, signals. Another use is to guide a drone by DF signals alone, without access to nav-aid signals for any reason. In one illustrative case, a drone is dispatched from an aircraft to autonomously find and engage a jammer by any means. The method is intended to cover determining drone position by determining direction to a plurality of jammers, the intersection of which direction is used to estimates drone location. The method comprises determining jammer position by determining jammer direction multiple times, e.g. while drone is flying a known path solving for the intersection of those directions.

The seeker method incorporates steps disclosed in US patent [Vosburgh and Wilson; and CIPS] determining and injecting an anti-jamming phase shift in a first antenna signal as means of reducing combiner output power to below a preset threshold, this phase shift determining jammer direction, with the calculation's fore-aft ambiguity being resolved as previously described.

The method is of feed-forward type, with the combiner output power monitored to indicate when one or more control parameter, e.g. phase shift, warrants adjusting to sustain cancellation Phase and/or RTA are adjusted to compensate for changes in jammer direction, e.g., due to relative motion between the jammer and the vehicle. To enhance cancellation, amplitude of the first signal is adjusted so it better matches that of the second signal. Relative time of arrival (RTA) is adjusted to match cancellation IBW to the bandwidth of a jammer, of a signal of interest, or to cover an entire operating band.

The quality of the combiner output signal is quantified, e.g. as a signal to noise ratio (SNR). When SNR of signals from the receiver fall below a preset threshold, receiver signals are set aside by the FC controller and the drone is guided according to signals provided directly by the DF.

Although described in terms of a jammer, the drone can be steered relative to any RF source, e.g. a cell tower, Wi-Fi repeater, or radio transmitter. One object of homing is to damage or destroy a jammer, be it kinetically, explosively or by electronic attack among other means. One alternative to homing on the source is to steer the drone from the jammer to improve SNR and reacquire nav-aid signals. A second illustration is to return home and fly again with fresh batteries. A third illustration is to navigate with respect to the jammer as if it were an aviation VORTAC/DME. A fourth illustration is bistatic homing on a reflected RF signal, analogous to missile homing on reflection from a target of laser light from a target designator; reflections can be of any RF signal, e.g. from a weather radar or cellular backhaul system. A fifth illustration is finding direction to or location of a jammer on the ground to support directing of fires, including by small arms, at a covert source of jamming, spoofing or other RF signals.

The present disclosure is intended to cover receivers that can also receive optical nav-aid signal. The disclosure is in terms of drones but is intended to cover any nav-aid reliant piloted, unmanned, remote controlled or autonomous vehicle, weapon or mobile sensing system.

The disclosed devices and method can be used to enhance receiving of video, data or communications reception in the presence of interference, for example providing electronic protection of a controller operated by a drone pilot. One advantage of the current invention avoids the cancellation of signals of interest that are a limitation of prior anti-jamming art, thereby providing more reliable data links, e.g. between collaborating drones in a swarm.

The invention claimed is:

1. A seeking device for navigating a vehicle comprising a direction finder connected to a flight controller, the direction finder comprising a combiner connected to at least a first antenna via a first signal path and to a second antenna via a second signal path, the combiner being further connected to a direction finder controller, the flight controller and/or an RF receiver, and the flight controller being any type that can control navigation of the vehicle in response to direction finding signals and/or signals from the RF receiver, wherein an output of the combiner includes a power detector;

wherein the direction finder is operable to adjust at least one parameter of the first signal path and/or the second signal path based on an output of the power detector;

wherein the direction finder controller is operable to determine a direction to a jammer and provide the direction finding signals by processing signals from the combiner; and wherein the flight controller is operable to control navigation of the vehicle in response to the direction finding signals when the signals from the RF receiver are degraded or disrupted.

2. The seeking device of claim 1, wherein the direction finder is a jammer mitigation type.

3. The seeking device of claim 1, wherein the direction finder is any type that is operable to adjust a phase, an amplitude, and/or a delay of at least a first signal from the first antenna relative to a second signal from the second antenna to reduce an output signal power of the combiner.

4. The seeking device of claim 1, wherein the first signal path and/or the second signal path comprise a relative time of arrival adjuster, an amplitude adjuster, and/or a phase adjuster connected to the direction finder controller.

5. The seeking device of claim 4, wherein the relative time of arrival adjuster is operable to change an instantaneous bandwidth (IBW) of cancellation to a bandwidth of an RF signal.

6. The seeking device of claim 4, wherein the phase adjuster operates by in-phase and quadrature (I/Q) rotation.

7. The seeking device of claim 1, wherein the RF receiver is any type that can receive navigation aiding signals.

8. The seeking device of claim 7, wherein the flight controller is operable to navigate the vehicle relative to the navigation aiding signals.

9. The seeking device of claim 1, wherein the direction finder controller is operable to determine a location of the jammer by determining a plurality of directions to the jammer.

10. The seeking device of claim 1, wherein the direction controller is operable to provide the direction finding signals to the flight controller.

11. A method for navigating a vehicle comprising the steps of providing a direction finder connected to a flight controller; the direction finder comprising a combiner connected to a first antenna via a first signal path and to a second antenna via a second signal path, the combiner being further connected to a direction finder controller and/or an RF receiver;

determining a direction to a jammer and providing direction finding signals using the direction finder controller by processing signals from the combiner;

controlling navigation of the vehicle using the flight controller in response to the direction finding signals and/or signals from the RF receiver;

controlling navigation of the vehicle using the flight controller in response to the direction finding signals when the signals from the RF receiver are disrupted; and controlling navigation of the vehicle using the flight controller in response to the direction finding signals when a signal-to-noise ratio (SNR) of the signals from the RF receiver fall below a threshold.

12. The method of claim 11, further comprising adjusting a phase, an amplitude, and/or a delay of a first signal from the first antenna relative to a second signal from the second antenna to reduce an output signal power of the combiner.

13. The method of claim 12, wherein adjusting the phase comprises in-phase and quadrature (I/Q) rotation of the first signal from the first antenna.

14. The method of claim 11, further comprising determining a location of the jammer by determining a plurality of directions to the jammer.

15. A vehicle, comprising:

a seeking device comprising a direction finder comprising a combiner connected to a first antenna via a first signal path and to a second antenna via a second signal path, the combiner being further connected to a direction finder controller and/or an RF receiver, and a flight controller being any type that can control navigation of the vehicle in response to direction finding signals and/or signals from the RF receiver;

wherein the direction finder controller is operable to determine a direction to a jammer and provide the direction finding signals by processing signals from the combiner;

wherein the direction finder controller is operable to determine a location of the jammer by determining a plurality of directions to the jammer; and wherein the flight controller is operable to control navigation of the vehicle in response to the direction finding signals when the signals from the RF receiver are disrupted.

16. The vehicle of claim 15, wherein an output of the combiner includes a power detector.

17. The vehicle of claim 16, wherein the direction finder is operable to adjust at least one parameter of the first signal path and/or the second signal path based on an output of the power detector.

18. The vehicle of claim 15, wherein controlling navigation of the vehicle in response to the direction finding signals comprises navigating away from the jammer, navigating towards the jammer, and/or navigating at an angle relative to the direction to the jammer.

19. A vehicle, comprising:

a seeking device comprising a direction finder comprising a combiner connected to a first antenna via a first signal path and to a second antenna via a second signal path, the combiner being further connected to a direction finder controller and/or an RF receiver, and a flight controller being any type that can control navigation of the vehicle in response to direction finding signals and/or signals from the RF receiver;

wherein the direction finder is operable to adjust a relative time of arrival of a first signal of the first signal path relative to a second signal of the second signal path to change an instantaneous bandwidth (IBW) of cancellation to a bandwidth of an RF signal;

wherein the direction finder controller is operable to determine a direction to a jammer and provide the direction finding signals by processing signals from the combiner; and wherein the flight controller is operable to control navigation of the vehicle in response to the direction finding signals when the signals from the RF receiver are disrupted.

* * * * *